(12) United States Patent
Isoda et al.

(10) Patent No.: US 8,253,287 B2
(45) Date of Patent: Aug. 28, 2012

(54) AUTOMOTIVE DYNAMOELECTRIC MACHINE

(75) Inventors: Hitoshi Isoda, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 350 days.

(21) Appl. No.: 12/615,470

(22) Filed: Nov. 10, 2009

(65) Prior Publication Data

US 2010/0308700 A1 Dec. 9, 2010

(30) Foreign Application Priority Data

Jun. 4, 2009 (JP) ................................. 2009-135373

(51) Int. Cl.
*H02K 11/00* (2006.01)
*H02K 9/02* (2006.01)
*H02K 19/22* (2006.01)

(52) U.S. Cl. .......... 310/68 D; 310/71; 310/68 B; 310/64
(58) Field of Classification Search ................ 310/68 D, 310/71, 68 B
See application file for complete search history.

(56) References Cited

U.S. PATENT DOCUMENTS

| | | | |
|---|---|---|---|
| 7,339,294 B2 * | 3/2008 | Oohashi et al. | 310/68 B |
| 7,400,070 B2 * | 7/2008 | Asao et al. | 310/58 |
| 7,400,076 B2 * | 7/2008 | Utsumi et al. | 310/263 |
| 7,411,324 B2 * | 8/2008 | Kusumi | 310/68 D |
| 7,414,339 B2 * | 8/2008 | Kitamura et al. | 310/68 D |
| 7,479,718 B2 * | 1/2009 | Kikuchi et al. | 310/68 R |
| 7,498,701 B2 * | 3/2009 | Kikuchi et al. | 310/68 B |
| 7,541,703 B2 * | 6/2009 | Uehara et al. | 310/68 D |
| 7,545,061 B2 * | 6/2009 | Asao et al. | 310/58 |
| 7,589,481 B2 * | 9/2009 | Sonoda et al. | 318/34 |
| 7,610,973 B2 * | 11/2009 | Asao et al. | 180/65.21 |
| 7,638,910 B2 * | 12/2009 | Akita et al. | 310/68 D |
| 7,646,120 B2 * | 1/2010 | Nishimura et al. | 310/68 R |
| 7,960,880 B2 * | 6/2011 | Hino et al. | 310/68 D |
| 8,110,954 B2 * | 2/2012 | Maeda et al. | 310/68 D |
| 2009/0179510 A1 * | 7/2009 | Yoshida et al. | 310/62 |
| 2010/0308700 A1 * | 12/2010 | Isoda et al. | 310/68 D |
| 2011/0101804 A1 * | 5/2011 | Isoda et al. | 310/64 |
| 2011/0273042 A1 * | 11/2011 | Isoda et al. | 310/63 |

FOREIGN PATENT DOCUMENTS

JP 2008-295116 A 12/2008

* cited by examiner

*Primary Examiner* — Karl Tamai
(74) *Attorney, Agent, or Firm* — Sughrue Mion, PLLC (57) ABSTRACT

An inverter power module includes: a heatsink that is shaped into a ring-shaped flat plate; a plurality of power MOSFETs that are mounted onto substrates, and mounted to a front surface of the heatsink; a circuit board that is a resin-molded body into which a plurality of inserted conductors are insert molded; and a bus bar that is fixed to the heatsink so as to be disposed on an opposite side of the circuit board facing the heatsink, and that is connected to a power source line of an inverter power circuit by means of a battery electric potential connecting terminal, the heatsink is electrically connected to the rear bracket by being fixed to the rear bracket, and the rear bracket is connected to a ground line of the inverter power circuit by means of the ground electric potential connecting terminal.

10 Claims, 6 Drawing Sheets

AUTOMOTIVE DYNAMOELECTRIC MACHINE

BACKGROUND OF THE INVENTION

1. Field of the Invention

The present invention relates to an automotive dynamoelectric machine that includes an inverter power circuit, and has a generating function and a motor mechanism, and particularly relates to a construction of a metal member that enables input and output of electric power to and from the inverter power circuit.

2. Description of the Related Art

Conventional automotive alternators include a rectifier that is constituted by: a positive-side heatsink that is shaped so as to have an approximate C shape, and on a front surface of which positive-side diodes are mounted; a negative-side heatsink that is shaped so as to have an approximate C shape, and on a front surface of which negative-side diodes are mounted; a circuit board that is shaped so as to have an approximate C shape, and into which inserted conductors for connecting the positive-side and negative-side diodes are insert molded; and an output terminal bolt that is knurled and press fitted into one circumferential end portion of the positive-side heatsink (see Patent Literature 1, for example).

The negative-side heatsink is disposed radially outside the positive-side heatsink, and the circuit board is disposed in front of the negative-side heatsink. In addition, flange portions that are disposed so as to extend radially outward from two circumferential sides and a central portion of the positive-side heatsink are interposed between the negative-side heatsink and the circuit board so as to ensure electrical insulation. The rectifier is mounted to the rear bracket by fastening mounting screws to an inner wall surface of the rear bracket that are passed through at three positions that include two circumferential sides and a central portion of a laminated body that is constituted by the positive-side heatsink, the negative-side heatsink, and the circuit board that have been stacked together.

Patent Literature 1; Japanese Patent Laid-Open No. 2008-295116 (Gazette)

In conventional automotive alternators, the negative-side heatsink is electrically connected to the rear bracket, which is kept at ground electric potential, and the positive-side heatsink is kept at battery electric potential by means of the output terminal bolt. Thus, if salt water, etc., enters a conventional automotive alternator, galvanic corrosion of the positive-side heatsink may occur. Fins on the positive-side heatsink are thereby reduced, making cooling performance of the positive-side heatsink deteriorate, and one problem has been that the temperature of the positive-side diodes may rise excessively.

SUMMARY OF THE INVENTION

The present invention aims to solve the above problems and an object of the present invention is to provide an automotive dynamoelectric machine that can suppress occurrence of galvanic corrosion by keeping a heatsink at ground electric potential.

In order to achieve the above object, according to one aspect of the present invention, there is provided an automotive dynamoelectric machine including: a housing that is constituted by a front bracket and a rear bracket; a rotor that is rotatably disposed inside the housing by being fixed to a shaft that is rotatably supported by the front bracket and the rear bracket; a stator including: a cylindrical stator core that is disposed so as to be held between the front bracket and the rear bracket so as to surround the rotor; and a stator winding that is mounted to the stator core; and an inverter power module that has an inverter power circuit that converts electric power bidirectionally between direct-current and alternating-current. The inverter power module includes: a heatsink that is shaped into a ring-shaped flat plate or a fan-shaped flat plate, and on a rear surface of which radiating fins are disposed so as to stand; a plurality of switching elements that are mounted onto a front surface of the heatsink with an electrically-insulating layer interposed; a circuit board that is a resin-molded body into which a plurality of inserted conductors are insert molded, that has a battery electric potential connecting terminal, a ground electric potential connecting terminal, a stator winding connecting terminal, and a signal wire connecting terminal that are constituted by exposed portions of the plurality of inserted conductors, that is disposed on a front surface side of the heatsink, and that connects the plurality of switching elements using the signal wire connecting terminal so as to constitute the inverter power circuit; and a bus bar that is fixed to the heatsink in an electrically-insulated state so as to be disposed on an opposite side of the circuit board facing the heatsink, and that is connected to a power source line of the inverter power circuit by means of the battery electric potential connecting terminal. The heatsink is electrically connected to the rear bracket by being fixed to the rear bracket, and the rear bracket is connected to a ground line of the inverter power circuit by means of the ground electric potential connecting terminal.

According to the present invention, a heatsink is electrically connected to a rear bracket by being fixed to the rear bracket, and the rear bracket is connected to a ground line of an inverter power circuit by means of a ground electric potential connecting terminal. Thus, even if salt water, etc., enters the automotive dynamoelectric machine, galvanic corrosion of the heatsink will not occur, suppressing deterioration of cooling performance of the heatsink that results from galvanic corrosion of the heatsink, thereby also suppressing excessive temperature increases in the switching elements.

DETAILED DESCRIPTION OF THE PREFERRED EMBODIMENTS

A preferred embodiment of a control apparatus-integrated automotive dynamoelectric machine according to the present invention will now be explained using drawings.

Figure 1:
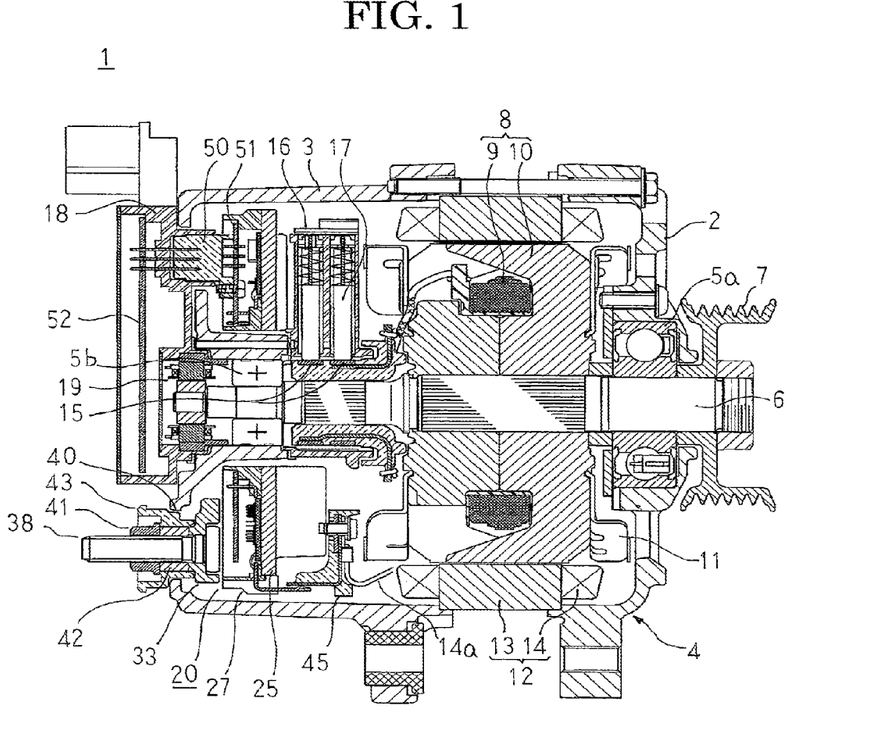
FIG. 1 is a longitudinal section of a control apparatus-integrated automotive dynamoelectric machine according to a preferred embodiment of the present invention.
Figure 2:
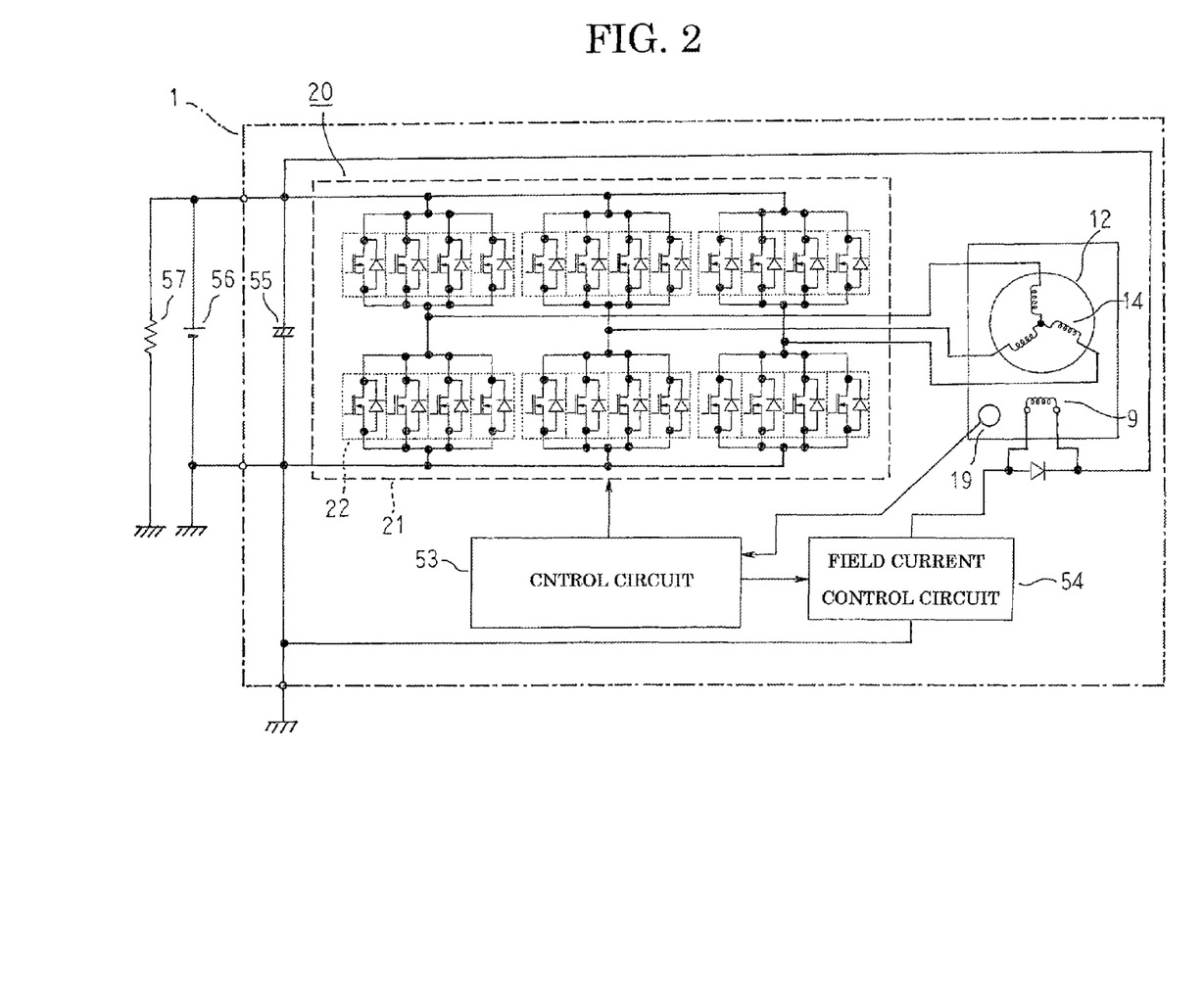
FIG. 2 is an electrical circuit diagram for the control apparatus-integrated automotive dynamoelectric machine according to the preferred embodiment of the present invention.
Figure 3:
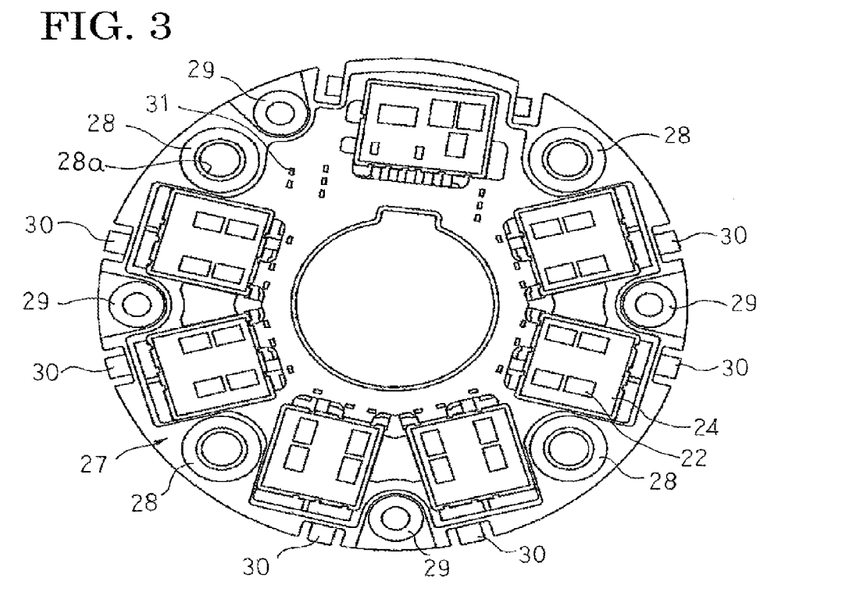
FIG. 3 is a plan that shows a state before mounting of a bus bar of an inverter assembly in the control apparatus-integrated automotive dynamoelectric machine according to the preferred embodiment of the present invention.
Figure 4:
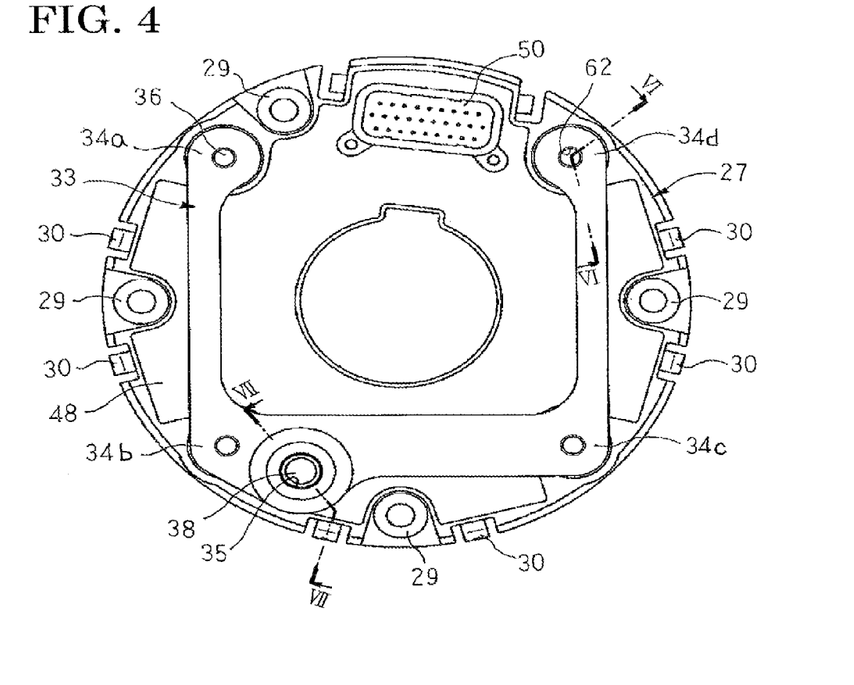
FIG. 4 is a plan of the inverter assembly in the control apparatus-integrated automotive dynamoelectric machine according to the preferred embodiment of the present invention when viewed from a rear end.
Figure 5:
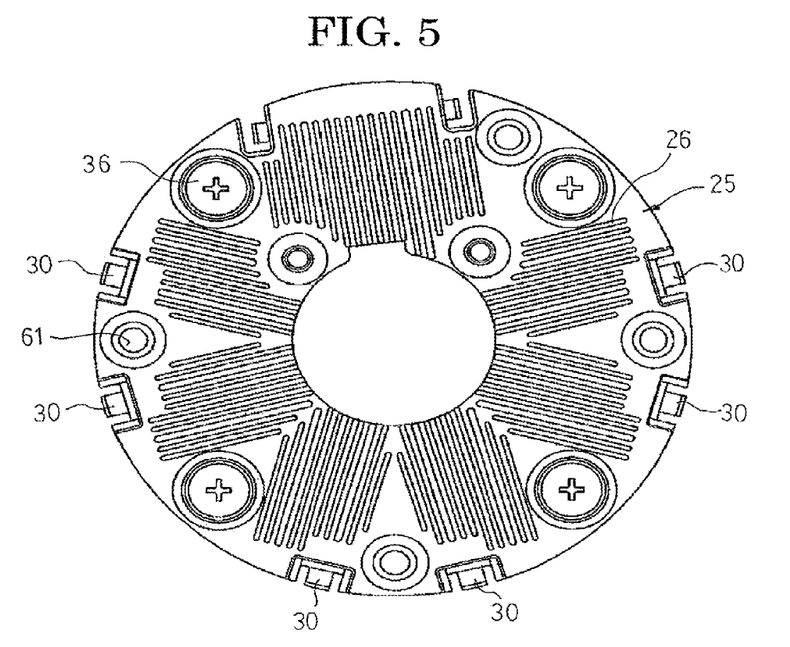
FIG. 5 is a plan of the inverter assembly in the control apparatus-integrated automotive dynamoelectric machine according to the preferred embodiment of the present invention when viewed from a front end.
Figure 6:
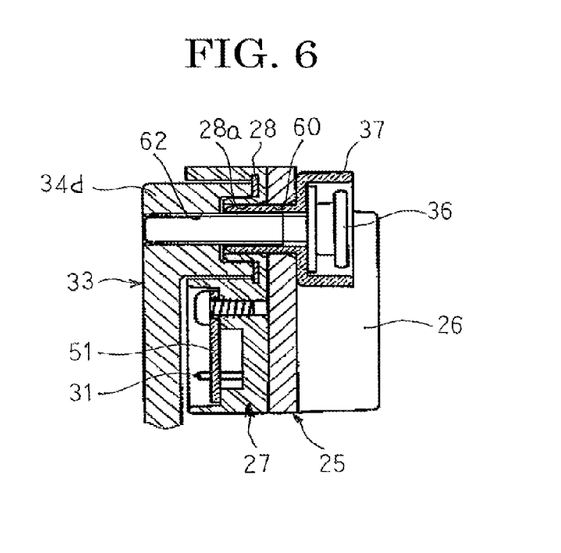
FIG. 6 is a cross section that is taken along Line VI-VI in FIG. 4 so as to be viewed in the direction of the arrows.
Figure 7:
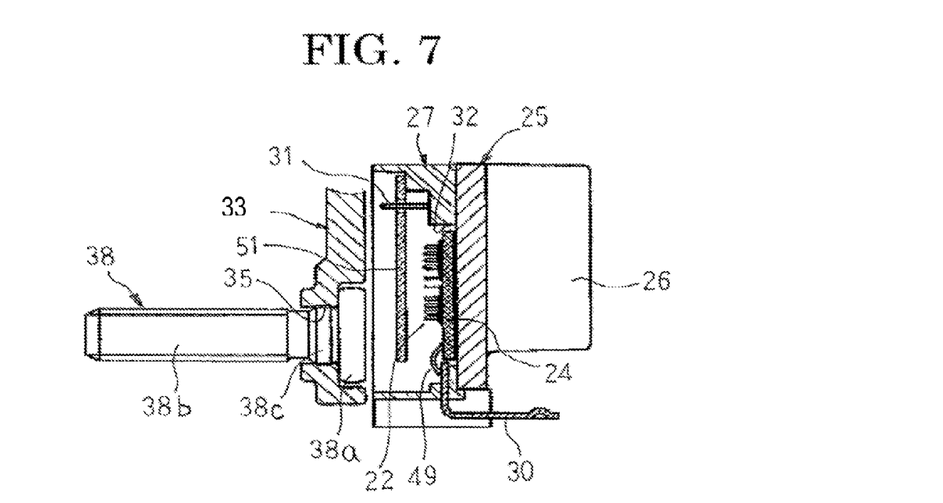
FIG. 7 is a cross section that is taken along Line VII-VII in FIG. 4 so as to be viewed in the direction of the arrows.
Figure 8:
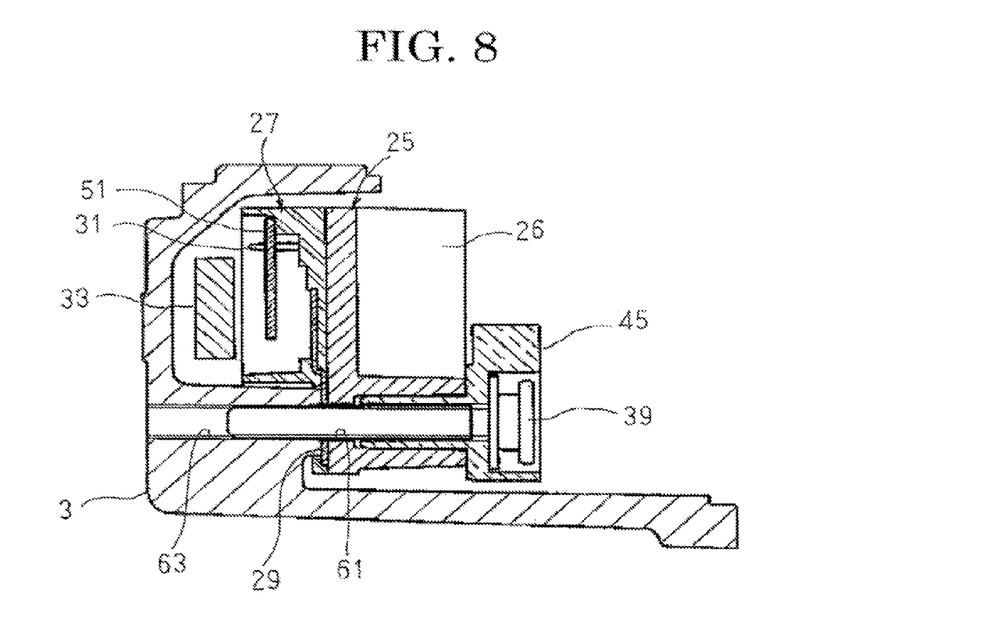
FIG. 8 is a partial cross section that explains a mounted state of the inverter assembly in the control apparatus-integrated automotive dynamoelectric machine according to the preferred embodiment.
Figure 9:
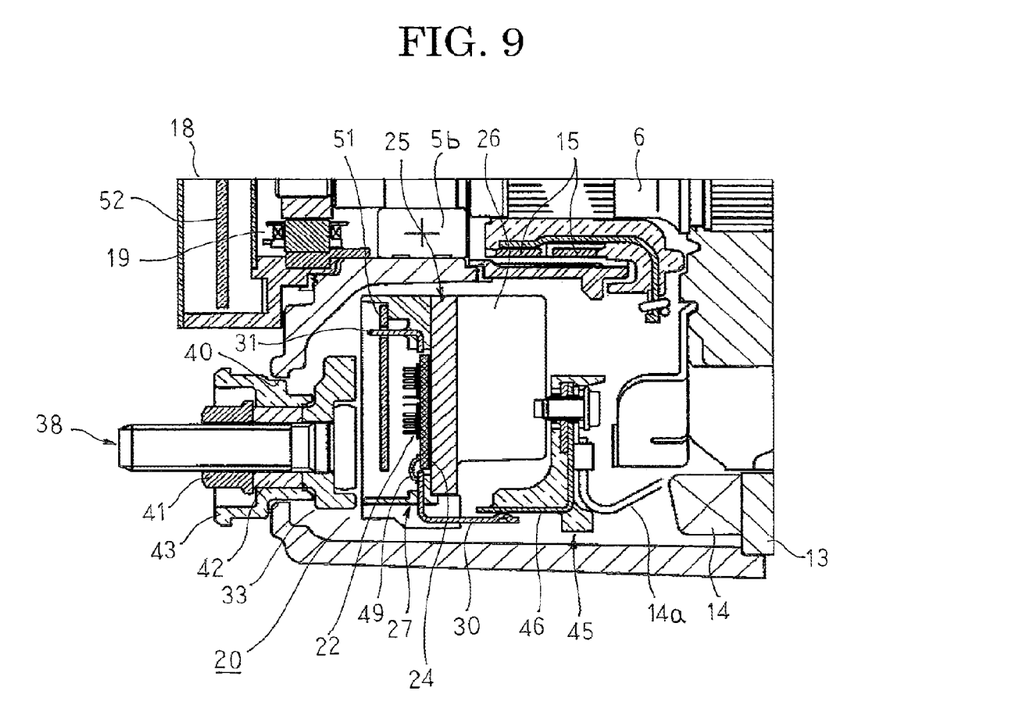
FIG. 9 is a longitudinal section of part of the control apparatus-integrated automotive dynamoelectric machine according to the preferred embodiment.

FIG. 1 is a longitudinal section of a control apparatus-integrated automotive dynamoelectric machine according to a preferred embodiment of the present invention, FIG. 2 is an electrical circuit diagram for the control apparatus-integrated automotive dynamoelectric machine according to the preferred embodiment of the present invention, FIG. 3 is a plan that shows a state before mounting of a bus bar of an inverter assembly in the control apparatus-integrated automotive dynamoelectric machine according to the preferred embodiment of the present invention, FIG. 4 is a plan of the inverter assembly in the control apparatus-integrated automotive dynamoelectric machine according to the preferred embodiment of the present invention when viewed from a rear end, FIG. 5 is a plan of the inverter assembly in the control apparatus-integrated automotive dynamoelectric machine according to the preferred embodiment of the present invention when viewed from a front end, FIG. 6 is a cross section that is taken along Line VI-VI in FIG. 4 so as to be viewed in the direction of the arrows, FIG. 7 is a cross section that is taken along Line VII-VII in FIG. 4 so as to be viewed in the direction of the arrows, FIG. 8 is a partial cross section that explains a mounted state of the inverter assembly in the control apparatus-integrated automotive dynamoelectric machine according to the preferred embodiment, and FIG. 9 is a longitudinal section of part of the control apparatus-integrated automotive dynamoelectric machine according to the preferred embodiment. Moreover, to facilitate explanation, silicone resin is shown only in FIG. 4.

In FIGS. 1 through 9, a control apparatus-integrated automotive dynamoelectric machine 1 (hereinafter "automotive dynamoelectric machine 1") includes: a housing 4 that is constituted by a front bracket 2 and a rear bracket 3 that are each approximately bowl-shaped and made of aluminum; a shaft 6 that is rotatably supported in the housing 4 by means of bearings 5a and 5b; a pulley 7 that is fixed to an end portion of the shaft 6 that extends outward at a front end of the housing 4; a rotor 8 that is fixed to the shaft 6 and that is disposed inside the housing 4; fans 11 that are fixed to two axial end surfaces of the rotor 8; a stator 12 that is fixed to the housing 4 so as to surround the rotor 8; a pair of slip rings 15 that are fixed to a rear end of the shaft 6, and that supply electric current to the rotor 8; a pair of brushes 17 that are housed inside a brush holder 16 that is disposed outside the pair of slip rings 15 so as to slide on the respective slip rings 15; a rotational position detecting sensor 19 that is disposed on a rear-end end portion of the shaft 6 so as to be held in a resin case 18 that is mounted to an outer axial end surface of the rear bracket 3; an inverter power module 20 that is disposed inside the rear bracket 3 so as to surround a bearing 5b; and a control circuit board 52 that is housed inside the resin case 18.

The rotor 8 includes: a field winding 9 that generates magnetic flux on passage of an excitation current; and a pole core 10 that is disposed so as to cover the field winding 9, and in which magnetic poles are formed by the magnetic flux. The stator 12 includes: a stator core 13 that is disposed so as to be held between the front bracket 2 and the rear bracket 3 from two axial ends so as to surround the rotor 8; and a stator winding 14 that is mounted to the stator core 13.

The inverter power module 20 includes: power metal-oxide-semiconductor field-effect transistors (MOSFETs) 22 that function as switching elements that constitute an inverter power circuit 21 that is described below; substrates 24 onto which the power MOSFETs 22 are mounted; a heatsink 25 onto which the substrates 24 are mounted; a circuit board 27 into which inserted conductors are insert molded; a bus bar 33; and an input-output terminal bolt 38.

As shown in FIG. 2, the inverter power circuit 21 is configured by connecting four power MOSFETs 22 in parallel to form first and second sets, forming pairs of sets by connecting sources of the power MOSFETs 22 in the first sets with the drains of the power MOSFETs 22 in the second sets, and disposing three pairs of sets in parallel.

The substrates 24 are ceramic circuit boards, for example, and four power MOSFETs 22 are mounted to the front surfaces of the substrates 24, and are connected in parallel by wiring patterns that are formed on the substrates 24.

As shown in FIG. 5, the heatsink 25 is prepared into a ring-shaped flat plate using a good heat-conducting material such as aluminum, copper, etc., and radiating fins 26 are disposed so as to stand on a back surface of the heatsink 25 at respective substrate mounting regions. Four bus bar mounting apertures 60 are disposed through outer circumferential edge portions of the heatsink 25 so as to have a predetermined spacing circumferentially. In addition, four heatsink mounting apertures 61 are also disposed through outer circumferential edge portions of the heatsink 25 so as to have a predetermined spacing circumferentially.

The circuit board 27 is a resin-molded part that is molded using an insulating resin such as a polybutylene terephthalate (PBT) resin, etc., so as to have a ring-shaped flat plate shape that has an internal shape and an external shape that are similar to those of the heatsink 25. Inserted conductors for electrical wiring are insert molded integrally into the circuit board 27. These inserted conductors are exposed on the front surface of the circuit board 27, and constitute battery electric potential connecting terminals 28, ground electric potential connecting terminals 29, stator winding connecting terminals 30, and signal wire connecting terminals 31.

Here, the signal wire connecting terminals 31 include: terminals that are connected to a power source line and a ground line of the inverter power circuit 21; terminals that are connected to connection points between the sources of the power MOSFETs 22 of the first sets and the drains of the power MOSFETs 22 of the second sets; and terminals that are connected to gate electrodes of each of the power MOSFETs 22, etc. The signal wire connecting terminals 31 that are connected to the power source line and the ground line of the inverter power circuit 21 are connected to the battery electric potential connecting terminals 28 and the ground electric potential connecting terminals 29 by means of the inserted conductors. The signal wire connecting terminals 31 that are connected to the connection points between the sources of the power MOSFETs 22 of the first sets and the drains of the power MOSFETs 22 of the second sets are also connected to the stator winding connecting terminals 30 by means of the inserted conductors.

As shown in FIG. 3, four battery electric potential connecting terminals 28 are each formed so as to have a ring shape, and are disposed on the front surface outer circumferential edge portions of the circuit board 27 so as to have a predetermined spacing circumferentially. Insertion apertures 28a are disposed through the circuit board 27 so as to be positioned inside openings of the ring shapes of the battery electric potential connecting terminals 28. Four ground electric potential connecting terminals 29 are each formed so as to have a ring shape, and are disposed on the front surface outer circumferential edge portions of the circuit board 27 so as to have a predetermined spacing circumferentially. In addition, substrate housing apertures 32 are disposed through the circuit board 27 so as to correspond to the substrate mounting regions of the heatsink 25. Here, the battery electric potential connecting terminals 28 and the ground electric potential connecting terminals 29 are respectively aligned with aperture positions of the bus bar mounting apertures 60 and the heatsink mounting apertures 61 when the circuit board 27 is stacked on the heatsink 25.

The substrates 24 are mounted to the respective substrate mounting regions of the heatsink 25 such that rear surfaces thereof are oriented toward the front surface of the heatsink 25. Here, the substrates function as an electrically-insulating layer, ensuring electrical insulation of the power MOSFETs 22 and the wiring patterns on the substrates 24 relative to the heatsink 25. In addition, the circuit board 27 is disposed on top of the front surface of the heatsink 25 such that a rear surface thereof is oriented toward the front surface of the heatsink 25 so as to house the substrates 24 inside the substrate housing apertures 32. The inverter power circuit 21 that is shown in FIG. 2 is configured by connecting the signal wire connecting terminals 31 and the wiring pattern of the substrates 24 by wire bonding, etc.

As shown in FIG. 4, the bus bar 33 is prepared using a copper material, etc., so as to have an angular C shape of which two end portions and two corner portions correspond to the disposed positions of the battery electric potential connecting terminals 28 of the circuit board 27. The two end portions and the two corner portions of the angular C shape are also formed so as to have wall thickenings that project outward on a rear surface side to constitute respective holding portions 34a through 34d. Internal thread portions 62 are formed so as to pass through in a thickness direction at each of the holding portions 34a through 34d. A mounting aperture 35 is also disposed through a spanning side between the holding portions 34b and 34c of the bus bar 33. Thicknesses of the spanning side between the holding portions 34a and 34b, the spanning side between the holding portions 34b and 34c, and the spanning side between the holding portions 34c and 34d are uniform, and widths of the spanning side between the holding portions 34a and 34b and the spanning side between the holding portions 34c and 34d are made narrower than the width of the spanning side between the holding portions 34b and 34c.

The input-output terminal bolt 38 is made of an electrically-conductive material such as iron, etc., and includes: a head portion 38a; a shaft portion 38b that is disposed so as to extend from the head portion 38a in one direction; and a knurled portion 38c that is formed on a root portion of the shaft portion 38b. As shown in FIG. 7, the input-output terminal bolt 38 is mounted to the bus bar 33 by press fitting the knurled portion 38c into the mounting aperture 35.

The bus bar 33 is disposed so as to face the heatsink 25 from an opposite side of the circuit board 27. As shown in FIG. 6, mounting bolts 36 are passed from a side near the heatsink 25 through the bus bar mounting apertures 60 and the insertion apertures 28a and are fastened into the internal thread portions 62 of the holding portions 34a through 34d, integrally fixing the heatsink 25, the circuit board 27, and the bus bar 33.

Here, insulating bushes 37 are interposed between the heatsink 25 and the mounting bolts 36, ensuring electrical insulation between the heatsink 25 and the bus bar 33. The holding portions 34a through 34d are placed in contact with the battery electric potential connecting terminals 28 by the fastening force of the mounting bolts 36, electrically connecting the battery electric potential connecting terminals 28 to the bus bar 33.

As shown in FIG. 8, an inverter power module 20 that is configured in this manner is mounted by orienting the heatsink 25 toward the front end (toward the rotor 8) and passing bolts 39 through the heatsink mounting apertures 61 and the ring-shaped openings of the ground electric potential connecting terminals 29 from the front end and fastening them into internal thread portions 63 that are formed on the rear bracket 3. Here, inner wall surfaces of the rear bracket 3 and the heatsink 25 and the ground electric potential connecting terminals 29 are electrically connected due to the fastening forces from the bolts 39. The inverter power module 20 is disposed inside the rear bracket 3 such that the shaft 6 is inserted through aperture centers of the central apertures of the heatsink 25 and the circuit board 27, and a front surface of the heatsink 25 is coplanar with a flat plane that is perpendicular to a central axis of the shaft 6. The bus bar 33 is disposed such that centers of the internal thread portions 62 of the holding portions 34a through 34d are positioned concentrically relative to the central axis of the shaft 6. In other words, the bus bar 33 is prepared so as to have an angular C shape that is centered around the central axis of the shaft 6.

The shaft portion 38b of the input-output terminal bolt 38 that projects axially outward from the bus bar 33 extends outward through a terminal lead-out aperture 40 that is disposed through the rear bracket 3. As shown in FIG. 9, a relay member 42 that has a cylindrical shape that is prepared using an electroconductive metal material is mounted so as to be fitted over the shaft portion 38b, and a nut 41 is fastened onto the shaft portion 38b. Thus, the bus bar 33 is fastened to the head portion 38a in a state of surface contact due to the fastening of the nut 41, and the nut 41, the relay member 42, and the bus bar 33 are also fastened in a state of surface contact, ensuring electrical connection between the nut 41 and the bus bar 33. An insulating bush 43 is also mounted to the terminal lead-out aperture 40, ensuring electrical insulation between the rear bracket 3 and the input-output terminal bolt 38.

A connecting board 45 is a resin-molded part that is molded using an insulating resin such as a PBT resin, etc., and six relay terminals 46 are insert molded therein. As shown in FIG. 8, the connecting board 45 is mounted to the inverter power module 20 by a bolt 39 that fastens the inverter power module 20 to the rear bracket 3. As shown in FIG. 9, output wires 14a of the three phase windings that constitute the stator winding 14 are connected to the respective relay terminals 46 of the connecting board 45, and the relay terminals 46 are joined to the respective stator winding connecting terminals 30 of the circuit board 27 by soldering, or crimping, etc. Thus, the three phase windings that constitute the stator winding 14 are electrically connected to the inverter power circuit 21 so as to be wye-connected.

As shown in FIG. 4, a signal wire output portion 50 is disposed at an opening end of the angular C-shaped bus bar on a rear end (front surface side) of the circuit board 27, and signal wire connecting terminals 31 that are connected to the gate electrodes of each of the power MOSFETs 22 are gathered together at the signal wire output portion 50 by means of a relay circuit board 51. A silicone resin 48 is applied to the circuit board 27 so as to embed the power MOSFETs 22, the relay circuit board 51, the bonding wires 49, etc.

A control circuit 53 that has elements that include custom integrated circuits and drivers that control operation of the power MOSFETs 22 is mounted to the control circuit board 52, and is electrically connected to the signal wire output portion 50.

Here, a field current control circuit 54 that controls field current to the field winding 9 and a capacitor 55, etc., are mounted internally into the brush holder 16. The capacitor 55 is connected in parallel with the inverter power circuit 21, and smooths voltage fluctuations due to switching of the power MOSFETs 22.

Next, operation of an automotive dynamoelectric machine 1 that is configured in this manner will be explained.

The automotive dynamoelectric machine 1 is linked to a crank shaft (not shown) of an engine by means of the pulley 7 and a belt (not shown). A battery wiring harness (not shown) that is connected to a positive electrode of the battery 56 is mounted onto a shaft portion 38b of the input-output terminal bolt 38, and is securely fastened by a nut (not shown) that is screwed onto the shaft portion 38b. The housing 4 is grounded so as to be kept at ground electric potential. The control circuit 53 controls a switching operation of the inverter power circuit 21. In addition, the control circuit 53 controls the field current control circuit 54 so as to adjust the field current that is passed to the field winding 9 of the rotor 8. The control circuit 53 has an inverter function for electric motor operation of the automotive dynamoelectric machine 1 and a rectifying function for power generation.

Here, during starting of the engine, direct-current power is supplied from the battery 56 to the inverter power circuit 21. The control circuit 53 that is mounted to the control circuit board 52 performs on-off control of the power MOSFETs 22 of the inverter power circuit 21 so as to convert the direct-current power to three-phase alternating-current power. The three-phase alternating-current power is supplied to the stator winding 14. Thus, a rotating magnetic field is imparted around the field winding 9 of the rotor 8 to which a field current is being supplied by the field current control circuit 54, driving the rotor 8 to rotate. Rotational torque from the rotor 8 is transmitted to the engine by means of the shaft 6, the pulley 7, and the belt (not shown) so as to ignite and start the engine.

Then, once the engine has been started, rotational torque from the engine is transmitted to the automotive dynamoelectric machine 1 by means of a crank pulley, the belt, and the pulley 7. Thus, the rotor 8 is rotated, inducing a three-phase alternating-current voltage in the stator winding 14. Then, the control circuit 53 performs on-off control of the power MOSFETs 22 of the inverter power circuit 21 such that the three-phase alternating-current power that has been induced in the stator winding 14 is converted into direct-current power, and is supplied to the battery 56, and an electric load 57, etc.

Moreover, signal output from the rotational position detecting sensor 19 is sent to the control circuit 53 that is mounted to the control circuit board 52, and is used for rotational position detection of the rotor 8, and is utilized used as control information during the power generating operation and the engine starting operation of the automotive dynamoelectric machine 1.

According to this embodiment, because the input-output terminal bolt 38 that is connected to the positive electrode of the battery 56 that constitutes an external power source is connected to the power source line of the inverter power circuit 21 by means of the bus bar 33, the power MOSFETs 22 can be mounted to a single heatsink 25. The heatsink 25 onto which the power MOSFETs 22 are mounted is electrically connected to the rear bracket 3, which is at ground electric potential. Thus, even if salt water, etc., does happen to enter the automotive dynamoelectric machine 1, galvanic corrosion of the heatsink 25 will not occur. Thus, circumstances in which cooling performance of the heatsink 25 deteriorates due to the radiating fins 26 of the heatsink 25 being reduced by galvanic corrosion can be avoided, suppressing temperature increases in the power MOSFETs 22, and improving reliability of the automotive dynamoelectric machine 1.

In the above embodiment, because the bus bar 33 is disposed on the front surface of the heatsink 25 onto which the power MOSFETs 22 are mounted, the heatsink 25 and the radiating fins 26 can be enlarged, enabling increases in heat radiating area, thus enabling cooling performance of the heatsink to be improved.

In the above embodiment, because the input-output terminal bolt 38 is supported by a spanning side between holding portions 34b and 34c of the bus bar 33, the input-output terminal bolt 38 is supported at two ends by the bus bar 33. Thus, even if vibration is transmitted to the bus bar 33 through the input-output terminal bolt 38, the bus bar 33 will not vibrate excessively, suppressing the occurrence of damage of the bus bar 33 that would otherwise result from vibration of the input-output terminal bolt 38.

In the above embodiment, because cross-sectional areas of spanning sides between the holding portions 34a and 34b and between the holding portions 34c and 34d of the bus bar 33 are made smaller than the cross-sectional area of the spanning side between the holding portions 34b and 34c, reductions in the size of the automotive dynamoelectric machine 1 are enabled, and material used in the bus bar 33 is also reduced, enabling costs to be reduced. Moreover, because the input-output terminal bolt 38 is not supported by the spanning sides between the holding portions 34a and 34b and between the holding portions 34c and 34d of the bus bar 33, it is not necessary to increase mechanical strength thereof.

In the above embodiment, the battery electric potential connecting terminals 28 are pressed and held between the holding portions 34a through 34d of the bus bar 33 and the heatsink 25 by fastening forces from mounting bolts 36 such that fixing of the bus bar 33 to the heatsink 25 and electrical connection between the bus bar 33 and the battery electric potential connecting terminals 28 are performed simultaneously. Thus, a need for separate members that electrically connect the bus bar 33 and the battery electric potential connecting terminals 28 is eliminated, facilitating assembly of the inverter power module 20, and also enabling reductions in the size of the automotive dynamoelectric machine 1. In addition, the bus bar 33, the circuit board 27, and the heatsink 25 are fixed firmly, improving reliability of the inverter power module 20.

In the above embodiment, because the bus bar 33 is formed so as to have an angular C shape, rigidity of the bus bar 33 is increased. Thus, mechanical strength of the inverter power module 20 is increased, enabling breakage of the inverter power module 20 due to vibration of the automotive vehicle or the automotive dynamoelectric machine 2 to be prevented.

In the above embodiment, because the bus bar 33 is formed so as to have an angular C shape, and the signal wire output portion 50 is disposed near an opening of the angular C-shaped bus bar on the circuit board 27, the signal wire output portion 50 can be disposed using mounting space on the circuit board 27 effectively. Thus, enlargement of the inverter power module 20 due to the signal wire output portion 50 being disposed is suppressed.

In the above embodiment, the inverter power module 20 is disposed inside the rear bracket 3. Thus, damage to the inverter power module 20 by airborne objects, etc., is prevented. Damage to the inverter power module 20 is also prevented if the automotive vehicle crashes. In addition, short-circuiting due to contact with external members is also prevented.

In the above embodiment, because the heatsink 25 is positioned near the rotor 8, and the bus bar 33 is positioned near the rear bracket 3, mounting of the input-output terminal bolt 38 onto the bus bar 33 is simplified.

Moreover, in the above embodiment, the heatsink is prepared into a ring-shaped flat plate, but the shape of the heatsink is not limited to a ring-shaped flat plate, and may also be a fan-shaped flat plate, for example. In that case, it is not absolutely necessary for the circuit board to be formed so as to have a similar external shape to that of the heatsink, but it may also be prepared into a fan-shaped flat plate similar to the heatsink. The inverter power module may be disposed such that a center of the fan shape of the heatsink is approximately aligned with a central axis of the shaft.

In the above embodiment, the bus bar is fastened to the heatsink at four positions, but there need only be two or more fixing positions between the bus bar and the heatsink.

In the above embodiment, widths of spanning sides between the holding portions of the bus bar are changed to change cross-sectional area that is perpendicular to a line of connection between holding portions, but thickness of the spanning sides between the holding portions of the bus bar may also be changed to change the cross-sectional area that is perpendicular to the line of connection between the holding portions.

In the above embodiment, the bus bar is formed so as to have an angular C shape, but the shape of the bus bar is not limited to an angular C shape, and may also be a C shape (a circular arc shape), or a V shape, for example.

What is claimed is:

1. An automotive dynamoelectric machine comprising:
    a housing that is constituted by a front bracket and a rear bracket;
    a rotor that is rotatably disposed inside said housing by being fixed to a shaft that is rotatably supported by said front bracket and said rear bracket;
    a stator comprising:
        a cylindrical stator core that is disposed so as to be held between said front bracket and said rear bracket so as to surround said rotor; and
        a stator winding that is mounted to said stator core; and
    an inverter power module that has an inverter power circuit that converts electric power bidirectionally between direct-current and alternating-current,
    wherein said inverter power module comprises:
        a heatsink that is shaped into a ring-shaped flat plate or a fan-shaped flat plate, and on a rear surface of which radiating fins are disposed so as to stand;
        a plurality of switching elements that are mounted onto a front surface of said heatsink with an electrically-insulating layer interposed;
        a circuit board that is a resin-molded body into which a plurality of inserted conductors are insert molded, that has a battery electric potential connecting terminal, a ground electric potential connecting terminal, a stator winding connecting terminal, and a signal wire connecting terminal that are constituted by exposed portions of said plurality of inserted conductors, that is disposed on a front surface side of said heatsink, and that connects said plurality of switching elements using said signal wire connecting terminal so as to constitute said inverter power circuit; and
        a bus bar that is fixed to said heatsink in an electrically-insulated state so as to be disposed on an opposite side of said circuit board facing said heatsink, and that is connected to a power source line of said inverter power circuit by means of said battery electric potential connecting terminal;
    wherein said heatsink is electrically connected to said rear bracket by being fixed to said rear bracket; and
    wherein said rear bracket is connected to a ground line of said inverter power circuit by means of said ground electric potential connecting terminal.

2. The automotive dynamoelectric machine according to claim 1, further comprising an input-output terminal bolt to which a positive electrode of an external power source is connected,
    wherein said bus bar is fixed to said heatsink at at least two fixing positions, and said input-output terminal bolt is supported by a portion of said bus bar between adjacent fixing positions.

3. The automotive dynamoelectric machine according to claim 2, wherein electrical connection between said battery electric potential connecting terminal and said bus bar is performed at at least one of said fixing positions between said bus bar and said heatsink.

4. The automotive dynamoelectric machine according to claim 2, wherein:
    at least three of said fixing positions between said bus bar and said heatsink are disposed; and
    a cross-sectional area that is perpendicular to a line that connects adjacent fixing positions of a portion of said bus bar between adjacent fixing positions by which said input-output terminal bolt is not supported is smaller than a cross-sectional area that is perpendicular to a line that connects adjacent fixing positions of said portion of said bus bar between adjacent fixing positions by which said input-output terminal bolt is supported.

5. An automotive dynamoelectric machine according to claim 4, wherein electrical connection between said battery electric potential connecting terminal and said bus bar is performed at at least one of said fixing positions between said bus bar and said heatsink.

6. An automotive dynamoelectric machine according to claim 1, wherein an internal thread portion is formed on said bus bar, and a mounting bolt is inserted through said heatsink and said circuit board and fastened into said internal thread portion so as to press and hold said circuit board and said heatsink between said bus bar and a head portion of said mounting bolt.

7. An automotive dynamoelectric machine according to claim 1, wherein said bus bar is prepared so as to have an approximately circular arc shape or an approximately angular C shape that is centered around a central axis of said shaft.

8. An automotive dynamoelectric machine according to claim 7, wherein a signal wire output portion that connects said inverter power circuit and a control circuit that controls a switching operation of said inverter power circuit is disposed on said circuit board near an opening of said bus bar.

9. An automotive dynamoelectric machine according to claim 1, wherein said inverter power module is disposed inside said rear bracket.

10. An automotive dynamoelectric machine according to claim 9, wherein said inverter power module is disposed such that said heatsink faces toward said rotor.

* * * * *